US009336545B2

(12) United States Patent
Shimmerlik et al.

(10) Patent No.: US 9,336,545 B2
(45) Date of Patent: May 10, 2016

(54) VENDING MACHINE AND METHODS FOR VENDING ITEMS

(71) Applicants: Brian Shimmerlik, New York, NY (US); Steven Bofill, Bethpage, NY (US); Brian Bofill, Bethpage, NY (US); Adam Gartenberg, New York, NY (US)

(72) Inventors: Brian Shimmerlik, New York, NY (US); Steven Bofill, Bethpage, NY (US); Brian Bofill, Bethpage, NY (US); Adam Gartenberg, New York, NY (US)

(73) Assignee: Vengo Inc., Long Island City, NY (US)

( * ) Notice: Subject to any disclaimer, the term of this patent is extended or adjusted under 35 U.S.C. 154(b) by 38 days.

(21) Appl. No.: 13/830,691

(22) Filed: Mar. 14, 2013

(65) Prior Publication Data
US 2013/0274917 A1 Oct. 17, 2013

Related U.S. Application Data

(60) Provisional application No. 61/613,769, filed on Mar. 21, 2012, provisional application No. 61/764,823, filed on Feb. 14, 2013.

(51) Int. Cl.
*G06Q 30/00* (2012.01)
*G06Q 30/06* (2012.01)
*G06Q 10/08* (2012.01)
*G06Q 30/02* (2012.01)
*B60P 3/025* (2006.01)
*G07F 9/10* (2006.01)

(52) U.S. Cl.
CPC ............. *G06Q 30/06* (2013.01); *B60P 3/0257* (2013.01); *G06Q 10/087* (2013.01); *G06Q 30/0207* (2013.01); *G06Q 30/0266* (2013.01); *G07F 9/10* (2013.01)

(58) Field of Classification Search
CPC ......... G07F 9/105; G07F 9/10; G07F 7/0609; G07F 11/26; G07F 11/38
See application file for complete search history.

(56) References Cited

U.S. PATENT DOCUMENTS

| 2,665,184 | A | | 1/1954 | Hord |
| 3,090,521 | A | | 5/1963 | Fazekas |
| 3,172,713 | A | * | 3/1965 | Rupert ........................ 221/275 |

(Continued)

FOREIGN PATENT DOCUMENTS

JP 9035139 2/1997

OTHER PUBLICATIONS

Written Opinion for Application No. PCT/US2014/071433 dated May 29, 2015; 12 pps.

(Continued)

*Primary Examiner* — Timothy Waggoner
(74) *Attorney, Agent, or Firm* — Michael D. Downs; Fincham Downs, LLC

(57) ABSTRACT

A vending machine for use in a vehicle includes: a vending housing operable to dispense at least one of a plurality of items stored within the vending housing; a display screen; and a processor coupled to the display screen and the vending housing. A vending computer program is configured to execute on the processor. The vending computer program, when executing, displays a selection of items on the display screen that can be purchased and dispensed from the vending housing and receives an identification of at least one item to be purchased. The program then receives a payment indicator indicating that payment has been received for the at least one item and controlling the vending machine to dispense that at least one item for which payment has been received. The vending machine is compact enough to be placed into a vehicle such as a taxi cab.

9 Claims, 14 Drawing Sheets

(56) References Cited

U.S. PATENT DOCUMENTS

| | | | |
|---|---|---|---|
| 3,204,816 A | 9/1965 | Johannes | |
| 3,486,658 A | 12/1969 | Cheslak et al. | |
| 3,831,807 A | 8/1974 | Deaton et al. | |
| 3,938,699 A | 2/1976 | Wittern et al. | |
| 4,043,483 A | 8/1977 | Gore et al. | |
| 4,560,088 A | 12/1985 | Tan | |
| 4,757,915 A | 7/1988 | Albright et al. | |
| 5,163,581 A * | 11/1992 | Lombardi, Jr. | 221/256 |
| 5,333,754 A * | 8/1994 | Kobayashi | 221/75 |
| 5,458,260 A * | 10/1995 | Sainato et al. | 221/22 |
| 5,509,573 A * | 4/1996 | Campoli | 221/133 |
| 5,588,555 A | 12/1996 | Kanamori | |
| 5,611,456 A | 3/1997 | Kasper | |
| 5,649,641 A | 7/1997 | Campoli | |
| 5,651,476 A | 7/1997 | Percy et al. | |
| 5,753,897 A | 5/1998 | Kasper | |
| 5,829,631 A | 11/1998 | Kasper | |
| 5,956,876 A * | 9/1999 | Burdette et al. | 40/606.02 |
| 5,971,205 A | 10/1999 | Michaels | |
| 5,996,838 A | 12/1999 | Bayer et al. | |
| 6,234,345 B1 * | 5/2001 | Minh et al. | 221/124 |
| 6,330,958 B1 | 12/2001 | Ruskin et al. | |
| 6,571,150 B2 * | 5/2003 | Arai et al. | 700/236 |
| 6,609,103 B1 * | 8/2003 | Kolls | 705/14.23 |
| 6,814,256 B2 | 11/2004 | Clark | |
| 6,959,230 B1 | 10/2005 | Leibu et al. | |
| 7,277,776 B2 | 10/2007 | Kim | |
| 7,357,314 B2 | 4/2008 | Kusakawa | |
| 7,395,946 B2 | 7/2008 | Yuyama | |
| 7,584,868 B2 | 9/2009 | Bauch | |
| 7,720,599 B2 * | 5/2010 | Miyawaki et al. | 701/426 |
| 7,735,681 B2 | 6/2010 | Handfeld et al. | |
| 7,787,988 B2 | 8/2010 | Whitten et al. | |
| 7,793,797 B2 | 9/2010 | Jarisch et al. | |
| 8,132,691 B2 | 3/2012 | Black, Jr. et al. | |
| 8,191,779 B2 | 6/2012 | Illingworth et al. | |
| 8,271,128 B1 | 9/2012 | Schultz | |
| 8,567,639 B2 | 10/2013 | Kim | |
| 8,655,485 B2 * | 2/2014 | Garber et al. | 700/242 |
| 2001/0000610 A1 | 5/2001 | Johnson | |
| 2002/0007868 A1 | 1/2002 | Kodama | |
| 2004/0050855 A1 | 3/2004 | Jurgenson | |
| 2004/0193310 A1 | 9/2004 | Clark | |
| 2004/0249502 A1 * | 12/2004 | Truong et al. | 700/232 |
| 2006/0184271 A1 | 8/2006 | Loveless | |
| 2010/0138037 A1 | 6/2010 | Adelberg et al. | |
| 2011/0071669 A1 | 3/2011 | Garber et al. | |
| 2012/0006204 A1 | 1/2012 | Eidenschink et al. | |
| 2012/0043345 A1 | 2/2012 | Garber et al. | |
| 2012/0059511 A1 | 3/2012 | Majer | |
| 2013/0043271 A1 | 2/2013 | South et al. | |

OTHER PUBLICATIONS

International Search Report for Application No. PCT/US2014/071433 dated May 29, 2015; 4 pps.
Office Action for 14/516,565 dated Mar. 4, 2016; 9 pps.
Office Action for 14/516,563 dated Feb. 18, 2016; 12 pps.

* cited by examiner

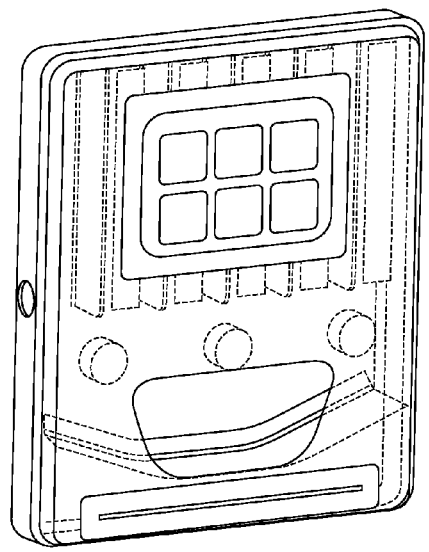
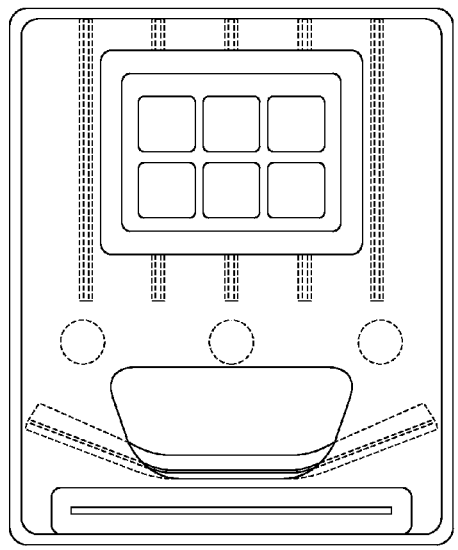
•THESE FIGURES SHOULD BE LABELED FIG. 11A-11D.
FIG. 11

VENDING MACHINE AND METHODS FOR VENDING ITEMS

CLAIM TO PRIORITY OF EARLIER FILED PROVISIONAL APPLICATIONS

This application claims the benefit of the filing date of the following earlier filed U.S. provisional patent applications:

1: U.S. Ser. No. 61/613,769 filed on Mar. 21, 2012, entitled "TAXI TREATS" and

2: Ser. No. 61/764,823 filed Feb. 14, 2013, entitled "MODULAR VENDING MACHINE WITH RELOADABLE CARTRIDGE SYSTEM"

The entire contents of these two provisional applications is hereby incorporated by reference in their entirety.

BACKGROUND

Conventional vending machines exist in a variety of locations. As an example, in a typical food court in a shopping mall, conventional vending machines exist as large upright freestanding devices that are often as tall as a grown adult (e.g. 6 feet tall) and that can weigh over one hundred pounds or more. In operation of a conventional vending machine, a customer approaches the machine and decides on an item that he or she would like to purchase from the machine (e.g. by viewing the items through a glass window). The customer then inserts money into the machine or swipes a credit card on a credit card reader of the machine. After all of the money is inserted into the machine or after credit card processing completes and authorizes the purchase, the customer is able to press a button or pull a lever to actuate a mechanism within the machine that causes the selected item to be dispensed from an opening on the front of the machine. The customer then reaches into the opening and retrieves the purchased item.

Owners of conventional vending machines employ a vending maintenance person who has the responsibility of periodically visiting the vending machine to determine the inventory of items contained in the machine (i.e. to determine if any items need to be restocked). The vending maintenance person typically has a daily route in which he or she visits numerous vending machines all day long, restocking each machine as needed along the route. The vending maintenance person often has a truck or van fully stocked with the various items that the vending machines on his or her route are capable of vending to customers. When the vending maintenance person arrives at a location of one or more vending machines, he or she typically retrieves a wheeled dolly or cart from the truck or van and places boxes of the items that the vending machines at that location can dispense onto the dolly or cart. The vending maintenance person then leaves the truck or van and takes the cart to the location of the vending machine (e.g. in a building). The maintenance person approaches the vending machine with the new stock of items on the cart and uses a key to unlock a door on the vending machine to inspect the inventory of the vending machine. If a particular type of item such as a candy bar has been vended numerous times to customers, the inventory of that candy bar will be low. In response, the vending maintenance person finds the corresponding type of candy bar in the boxes of new stock items on his or her cart, opens the box of items, retrieves a handful of items and inserts the new items one by one into the machine to replace the items that had been vended from the machine since the last time that vending maintenance person restocked the machine.

To vend each item, a typical conventional vending machine might include a spiral or corkscrew shaped motorized wire that can rotate one full turn in order to dispense a single item from the vending machine in response to a customer paying for that item. As more and more items are dispensed from the vending machine (in response to different customers purchasing those items), the spiral shaped wire will begin to have open spaces (one for each item vended) in between its spirals due to the purchase of those items. The vending maintenance person manually restocks each spiral for a given type of item (e.g. a certain type of candy bar) by placing individual items such as the candy bars within the open spaces of any unfilled spirals. When all items have been restocked in this manner, the vending maintenance person closes and locks the housing of the vending machine and moves on to the next machine on the route. This process is repeated periodically by the vending maintenance person on a daily or weekly basis depending upon how frequently items are purchased from the machine.

SUMMARY

Conventional vending machines suffer from a variety of deficiencies. In particular, the process of restocking conventional vending machines using a vending maintenance person who must visit the machine in remote locations is burdensome and inefficient. As an example, the vending maintenance person must visit a given vending machine location a number of times before he or she begins to understand the rate of consumption of items vended from the machine. The vending maintenance person may arrive in a vending machine only to find that only a small number of items have been purchased from the machine thus making the trip to the machine to restock the machine a waste of time.

Additionally, the vending maintenance person must transport from his or her vehicle all of the possible items that the vending machine can vend in case any of those items need to be restocked. It may be the case that the vending maintenance person transports an entire case of candy bars from his or her van to the vending machine, only to find out that no candy bars of that type have been purchased from that vending machine since the vending maintenance person's last visit. Further still, the conventional design of vending machines requires the vending maintenance person to manually stock each item one by one into the vending machine. This is slow and cumbersome and causes the entire process of restocking the vending machine to full capacity to take a substantial amount of time, thus reducing the overall number of vending machines that a given vending maintenance person can restock in a given time (e.g. within one day of work).

Other deficiencies of conventional vending machines exist as well. In particular, the transaction of a consumer purchasing an item from a conventional vending machine is a standalone transaction. That is, the amount of money that the consumer provides to the vending machine is equivalent to the purchase price of the item that is dispensed from the machine. The consumer is not able to combined the purchase of other items that are external to the vending machine with one or more items dispensed by the vending machine.

Another deficiency of conventional vending machines is that due to their large size and form factor, they are not mobile or easily movable. As a result, customers must approach the vending machine. Conventional vending machine is not able to approach the customer.

In contrast, a vending machine and methods of operation of a vending machine as disclosed herein significantly overcome at least some of these and other deficiencies found in conventional vending machines.

An example vending machine as disclosed herein is contained as a small transportable unit that may be, for example, mounted within a vehicle such as a taxicab, bus, car, van, train, boat or other type of mobile vehicle. By reducing the physical size of the vending machine, the vending machine as disclosed herein can be mounted for example, on the backside of a front seat of a taxicab for example. This allows the vending machine to come to the customer in a manner such that when a customer enters a taxicab, the vending machine is presented in front of the customer allowing that customer to purchase items from the vending machine during the transport of that customer in the taxicab.

An example vending machine configured in accordance with embodiments disclosed herein utilizes a cartridge loading system in which items are pre-stocked within cartridges that may be inserted into the vending machine in a central restocking facility. In this manner, individual items dispensed from the vending machine do not have to be individually stocked into each vending machine within each vehicle. Rather, the vehicle can arrive at the restocking facility and individual cartridges containing a plurality of items that are fully stocked can be simply inserted into the vending machine in order to replace cartridges that are either fully or partially empty which are simply removed from the vending machine. This cartridge exchange system significantly reduces the time required to restocked a vending machine as disclosed herein.

Additionally, an example vending machine as disclosed herein can allow for the purchase price of an item to be combined with the cost of an external product or service also purchased by the customer such as the fare of the taxicab to arrive at the destination. In this manner, as the customer sits in the back of the taxicab, he or she can purchase one or more items from the vending machine in the purchase price of these items is added to the fare of the taxi ride. When the customer arrives at his or her destination, the customer can pay for both the taxi fare and the purchase price of the items vended from the machine in a single transaction, either using the payment system in the taxicab or using a payment system within the vending machine which includes the taxicab fare. Other features of example vending machines disclosed herein will be described in more detail below.

In a particular embodiment, the system provides a vending machine for use in a vehicle. The vending machine comprises a vending housing operable to dispense at least one of a plurality of items stored within the vending housing, a display screen and a processor coupled to the display screen and the vending housing. A vending computer program is configured to execute on the processor. The vending computer program, when executing on the processor, is operable to perform operations of displaying a selection of items on the display screen that can be purchased and dispensed from the vending housing. The machine receives an identification of at least one item to be purchased. The machine receives a payment indicator indicating that payment has been received for the at least one item. The vending computer program controls the vending machine (e.g. controls an electronic and/or mechanical dispensing mechanism within the housing) to dispense the item(s) for which payment has been received. The vending housing encases the display screen and the processor. The vending housing is sized appropriately to mount within a taxicab or other vehicle. When the identification of the at least one item to be purchased is received from a passenger of the taxicab, the vending housing dispenses the item(s) to the passenger of the taxicab within the taxicab.

An example vending machine configured in accordance with embodiments disclosed herein is referred to as a taxitreats machine in parts of this disclosure. Taxitreats is the name for the machine within a taxi cab and is not intended to be limiting of the system disclosed herein.

DESCRIPTION OF FIGURES

FIG. 11 is a third view of the TaxiTreats machine consisting of four separate views of the TaxiTreats machine from separate angles.

DETAILED DESCRIPTION

Generally then, the system disclosed herein is a vending machine with the purpose of generating commerce within modes of transportation. Modes of transportation may include, but are not limited to, vehicles-for-hire, taxis, trains, planes, subways and commuter boats in metro and suburban areas.

Figure 1:
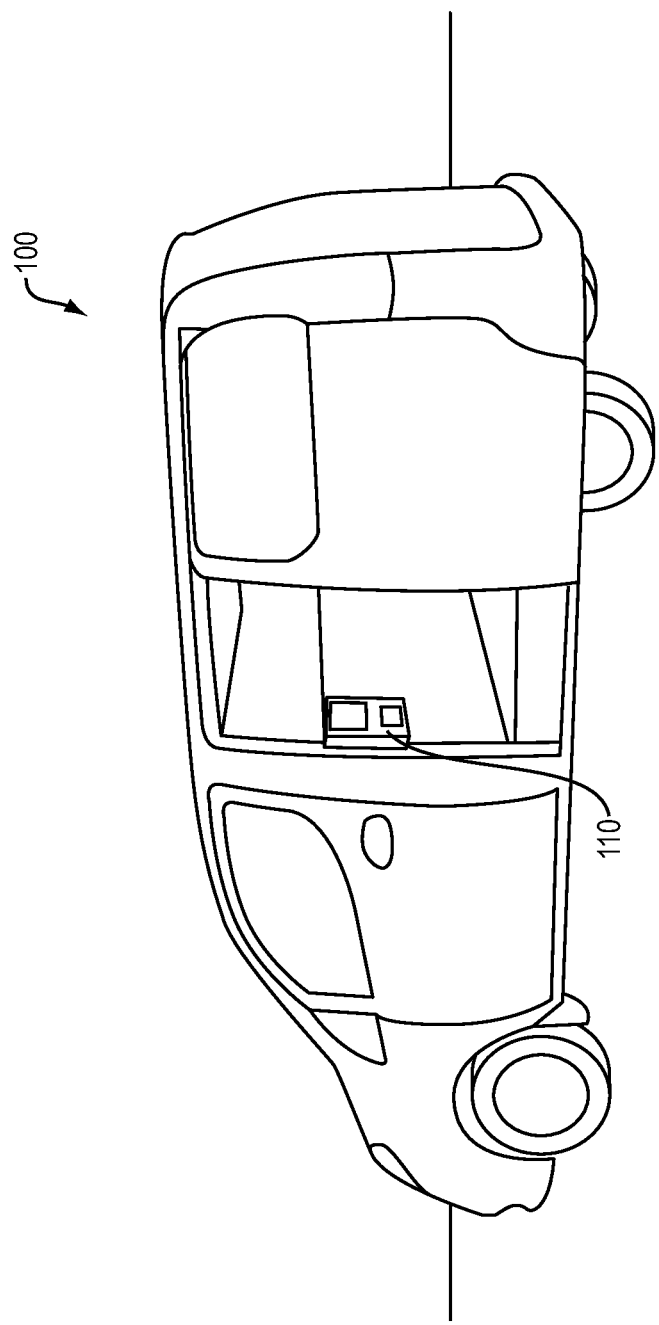
FIG. 1 is a view of the machine in an example vehicle from the exterior side of the taxi on the driver's side.

FIG. 1 shows a vehicle 100 that is configured with an example vending machine 110 as disclosed herein. Note that the vehicle is mobile thus the vending machine 110 is also mobile and is transported to the customers by way of the vehicle 100. It is to be understood that a taxicab is shown as the vehicle by way of example only and embodiments of the invention are not limited to a vending machine mounted within a taxicab. Rather, any type of vehicle can include a vending machine as disclosed herein.

Figure 2:
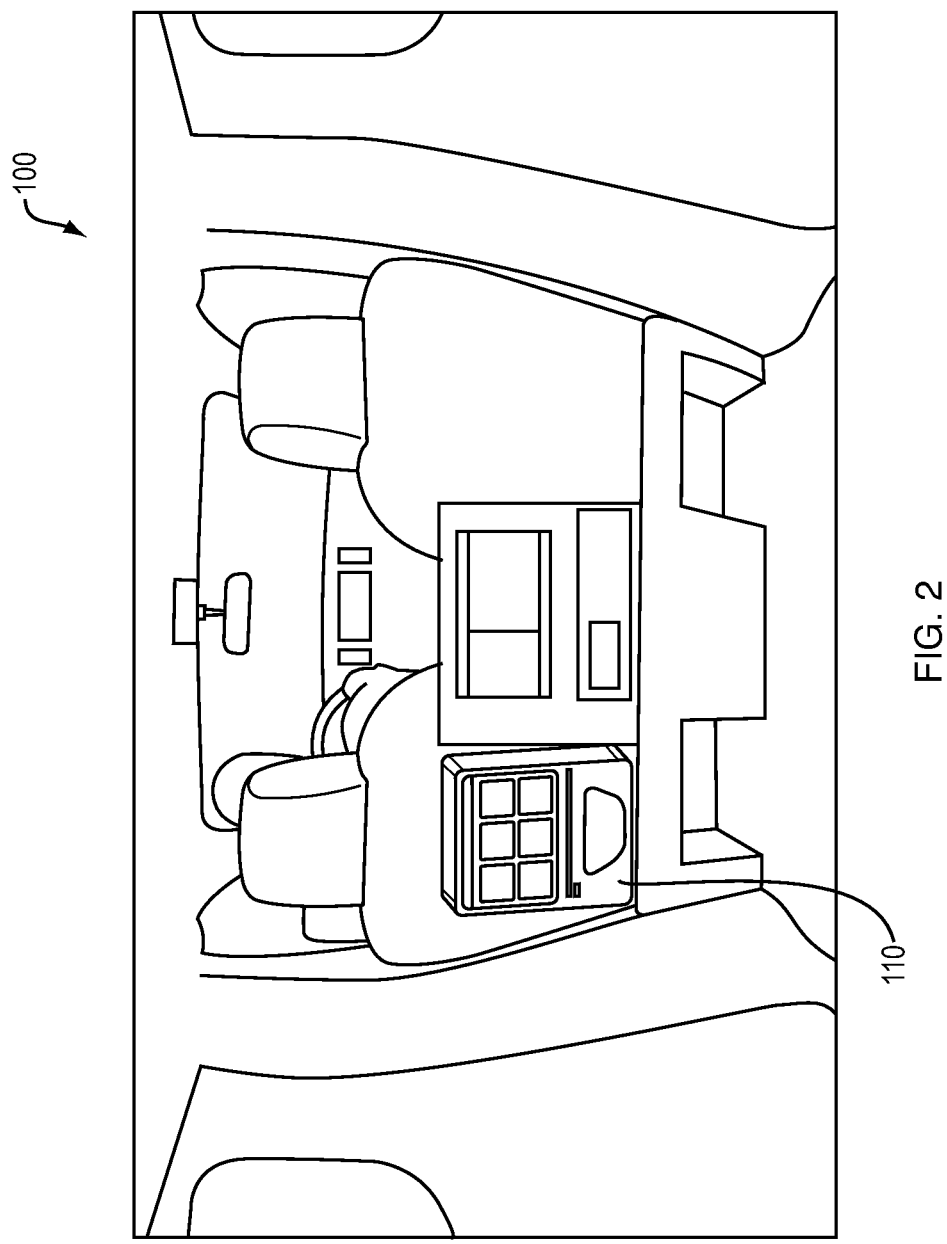
FIG. 2 is a vending machine (e.g. a TaxiTreats machine) installed in the example vehicle from the passenger point of view.

FIG. 2 shows the vending machine from the customer's point of view, installed in the example taxi cab as a "taxi-treats" vending machine.

Figure 3:
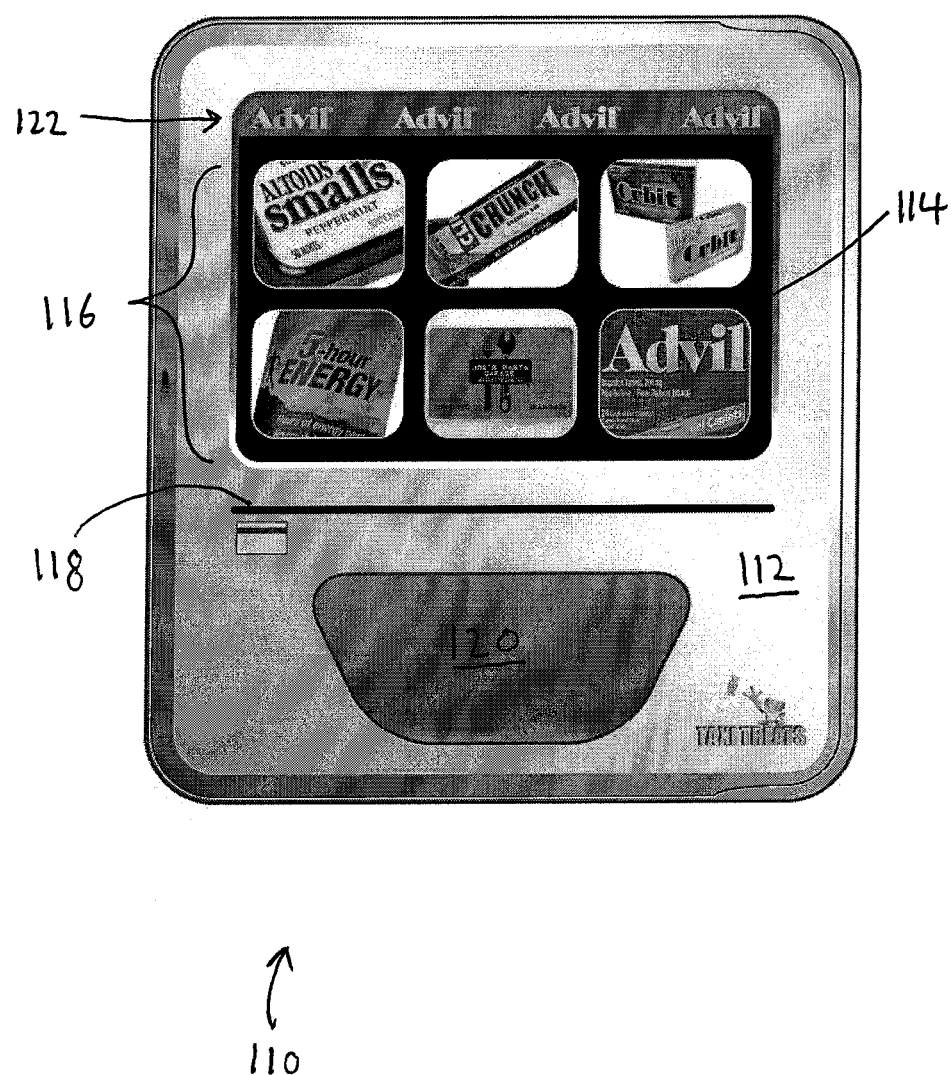
FIG. 3. is a closer view of the TaxiTreats machine in FIG. 2.

FIG. 3 shows a front view of the vending machine 110. The view in FIG. 3 includes the vending machine 110, its housing 112 fits seamlessly into its environment (a taxi in this example), and the figure demonstrates its components: the touch screen display 114 with six available items 116 (touching each item brings up the view in FIG. 4 and then FIG. 5), the sample point-of-sale banner advertisement 122 (e.g. pain medication), the credit card processor 118 (the slot underneath the touch screen in this example), the area or opening 120 to collect the vended physical item or access to a future item or a receipt, and the TaxiTreats logo (lower left of machine).

Figure 4:
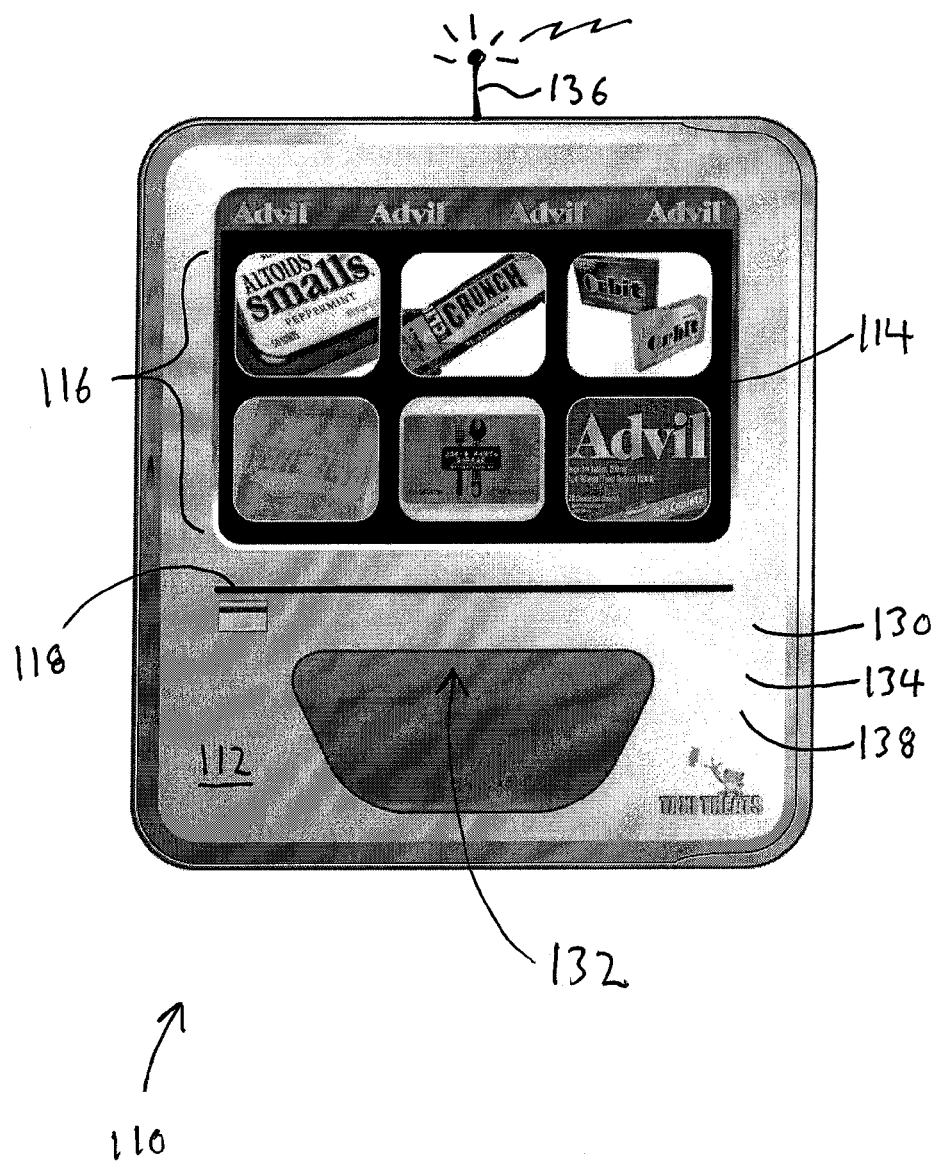
FIG. 4 is a view of the passenger experience immediately following the selection of one of the items available to vend, whether the item is physical or virtual or whether the item is to be collected immediately or in the future.

FIG. 4 shows another front view of the vending machine 110. The system provides a touch-screen or display 114 that displays information to the passenger(s), a storage area for retail goods, a mechanism 118 for collecting payment via credit card, a mechanism (shown in some detail in FIG. 10) to vend selected retail item(s) upon credit card payment approval, a mechanism for collecting payment via a wireless telephone through an application (the wireless phone communicating with a processor 130 (contained within the housing and in electrical communication with the display 114 in the vending machine housing 112), a mechanism for printing receipts 132 and a software program (vending computer program) 134 to execute the menu of items available 116 for purchase, the transactions and a wireless communication mechanism 136 that is operable to communicate between the machine and the TaxiTreats headquarters to wirelessly relay transactions, malfunctions and inventory.

The machine may also transmit information to the centralized location of the organization or owner of the mode of transportation whether public or private (e.g. a central restocking facility). In this manner, the system can include an inventory tracking module 138 integrated with the processor 130. The inventory tracking module 138 is operable to keep track of inventory of items that can be vended form the vending machine. The inventory tracking module 138 is also operable to communicate inventory information of items in the vending machine to a remote location (via wireless device 136) to allow the remote location to identify, to a vending machine operator, the inventory information. Thus the wireless communication mechanism 136 is operable by the vending computer program 134 to wirelessly transmit product data to and from the vending machine. The product data can include some or all of the following: data concerning items to be vended by the vending machine at specific times of the day; data concerning items to be vended by the vending machine when a taxicab is located in proximity to specific locations; data concerning quantity of items stocked within the vending machine; data concerning advertising information to be displayed on the display; and data concerning items to be delivered to a passenger of a taxicab at alternate locations that are not within confines of the taxicab. By communicating wirelessly, the vending machine does not require a person to inspect the machine periodically to determine what inventory of items is required to be replaced or restocked in the machine 110.

Figure 5:
FIG. 5 is a view of the user experience following the selection of an item (selection of item seen in FIG. 4).
Figure 9:
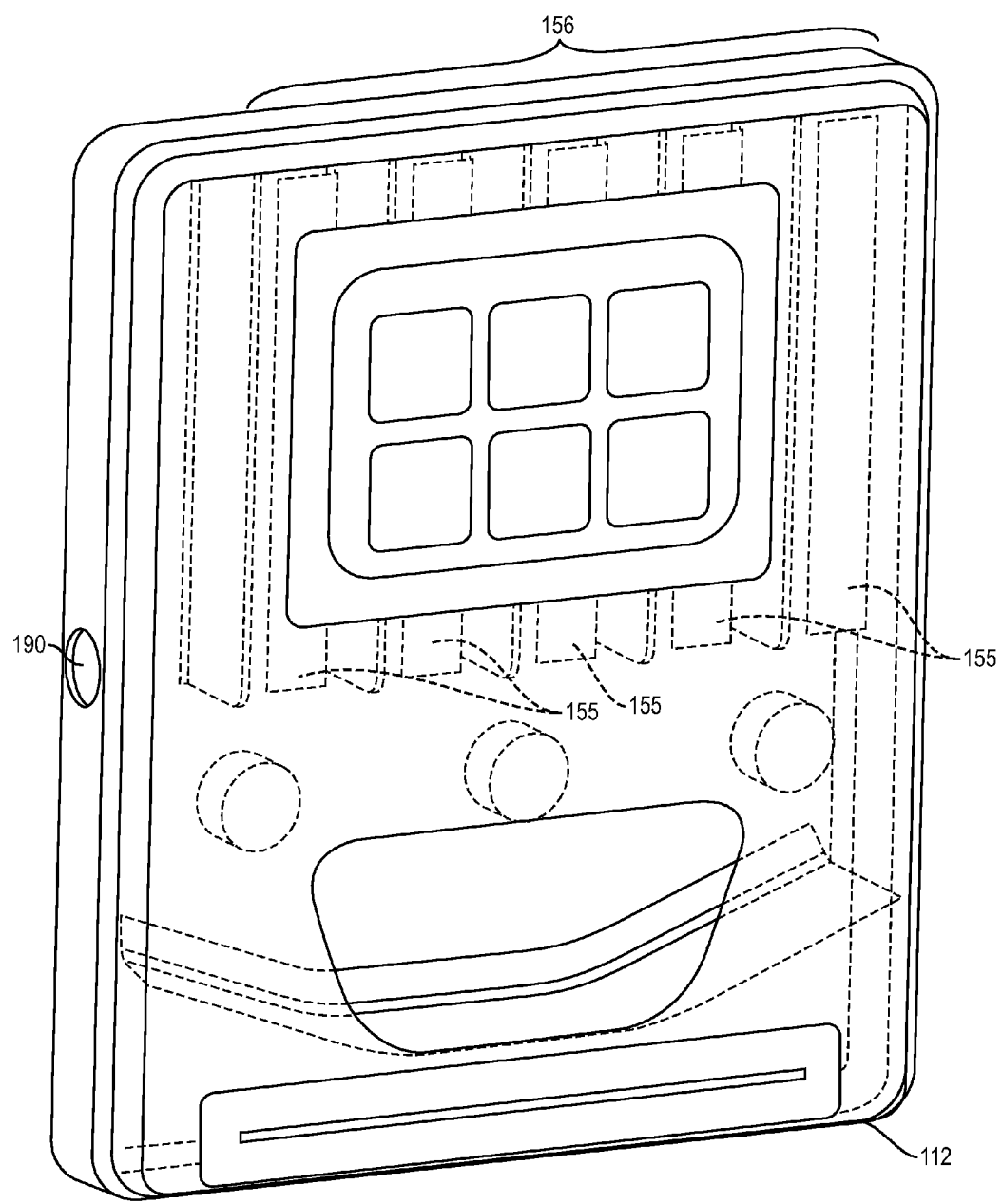
FIG. 9 is a view of the TaxiTreats machine designed by a mechanical engineer using CATIA engineering software.

In FIG. 5, the screen or display 114 will offer a quantity selection choice 140 to purchase multiple items. The passenger can now select to purchase multiple quantities of the selected item. The screen or display 114 displays visualizations 116 of retail items available for purchase and collection immediately. These retail items may be stored within the machine (e.g. within the columns 156 in which cartridges 155 are installed as shown in FIG. 9), behind or above the screen 114 or the items (depicted by the icons 116 on the display, and as item 170 vended in FIG. 6) may be stored within the mode of transportation (e.g. within the taxi) at an alternate location from the screen, including, but not limited to, the mode of transportation floor, the console, the trunk or the roof (e.g. of the taxi). The items may or may not be held in a cartridge system 156 in FIG. 9) within the machine that facilitates fast restocking. The screen 114 may have several pages of different items available for view and purchase. The items may or may not change regularly or be wholly different in various regions or at various time of day.

In one example configuration, when the vending machine 110 displays a selection of items 116 on the display screen 114 that can be purchased, the vending computer program performs operations of identifying a location associated to the vending machine. In one configuration, the location can be a final destination location of the taxi cab or a current location of the taxicab. Based on the location, the program identifies a selection of products related to the location. A GPS receiver can be used for purposes of determining a location of the machine as it travels in the vehicle. The program displays the selection of products available for purchase from the vending machine that is contingent on the location. In another configuration, identifying a selection of products related to the location can include identifying, for example, event tickets for an event that will take place at a venue that is proximate to the location (i.e. that is near the GPS location of the taxicab), and/or it can identify discounts for at least one product or service at a venue that is proximate to the location. This can be done by keeping a database of locations along with tickets or discounts for places near those GPS locations. When the program detects that a location is near a location of a venue, it can display the availability of tickets or a discount for those locations, along with information concerning the location (such as advertising for the venue).

The screen 114 (i.e. display) may also contain/display items available for purchase that will be delivered to an alternate location at a current or future time. The screen may print a receipt for the passenger to serve as documentation of the transaction or to function as a ticket to redeem a good or service in the future. The machine may provide a physical card with a magnetic strip or bar code that may serve as to facilitate access to a good or service.

The machine may integrate with the existing transportation meter or payment system and allow for payment of the fare through the invention. The invention may integrate payment of the transportation fare with payment of the retail good(s) or services sold and receive a consolidated payment. The payment will be inclusive of all required state and local sales taxes. The invention may provide the current location of the mode of transportation and other pertinent information to the passenger such as information about the mode of transportation or its operator. The invention may sell tickets to events in the region of the mode of transportation. The invention may offer advertising and/or deals specific to the location of the destination of the mode of transportation or the general region of the mode of transportation.

In this manner, the fare payment system of the taxicab is integrated into the vending machine and the processor in the vending machine enables payment to be received for both the item(s) to be purchased and the fare for passenger use of the taxicab. The display of the vending machine displays both the fare for the taxicab as well as the cost of the at least one item on the same display. The system can identify a cost of the at least one item to be purchased (e.g. from a database, or from the cartridge that can be encoded with a bar code, RFID tag, or other mechanism that can be read by the processor when the cartridge is installed. This enables a passenger of the taxicab to provide a single payment that includes the cost of the item(s) to be purchased/vended and the fare of the passenger for use of the taxicab to reach a destination. In one configuration, the processor is electrically coupled to a fare payment system in the taxicab used to allow the passenger to pay a fare. When the processor provides the cost of the item(s) to be purchased to the fare payment system, the fare payment system combines the cost of the item(s) with the fare of the passenger to produce and display a total cost for the passenger to pay.

Figure 6:
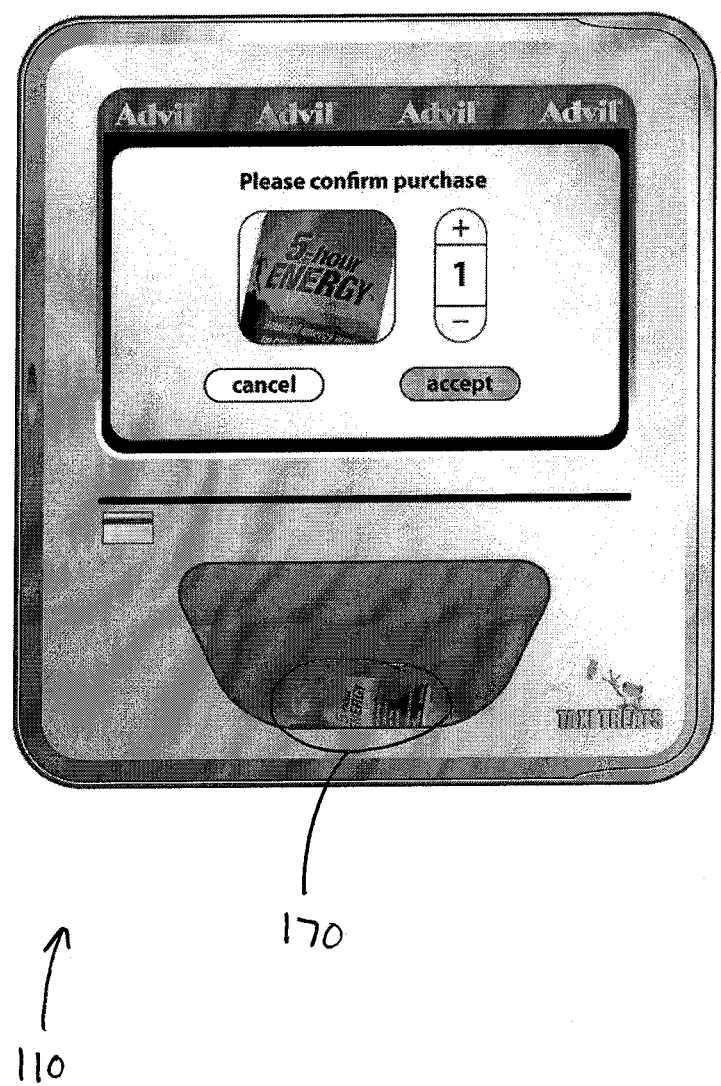
FIG. 6 is a view of the user experience to the extent the user completes a purchase of one unit of 5-Hour Energy.
Figure 7:
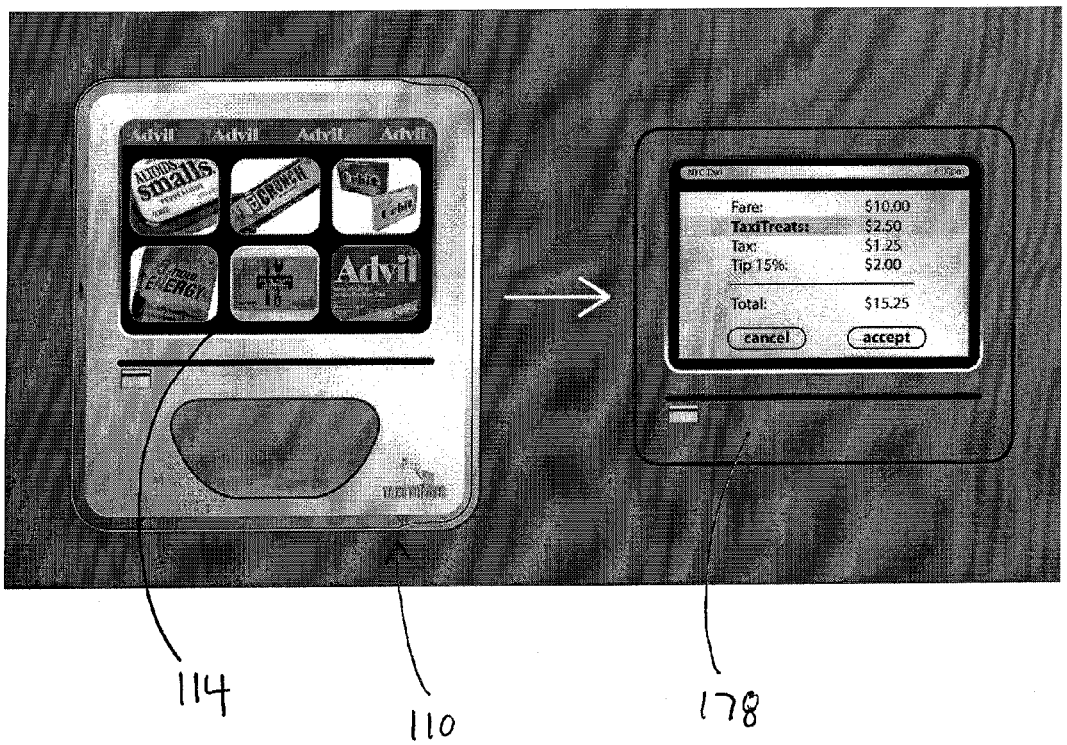
FIG. 7 shows an example relationship that the TaxiTreats machine can have with the mode of transportation's existing technology and payment system which is a taxi cab fare payment system in this example.

FIG. 6 shows an item 170 vended from the machine opening, and FIG. 7 shows how the cost 171 ($2.50 in this example) of the item is included in the fare for the taxi cab by integrating with the taxicab payment system 178. In this example, the TaxiTreats purchase may trigger the TaxiTreats machine to send an electronic signal to the existing taxi payment system 178 to add the TaxiTreats purchase price to the price of the taxi fare. The price of the vended item, in this example, $2.50, will be paid along with the fare to the taxi driver in cash or to the taxi owner by credit card. The taxi owner may then pay TaxiTreats at the end of each day the price of total TaxiTreats purchases by reducing the taxi's credit card purchases by an equal amount. The configuration in FIG. 7 thus provides 2 display screens 114 and 178. In another configuration the display screen upon which the processor displays a selection of items to be purchased is a same display screen upon which a fare is displayed to the passenger for use of the taxicab to reach a final destination. It is important to note that the vending machine in accordance with an example embodiment does not enable payment with cash or money inserted into the vending machine. This enables a small form factor thus allowing the vending machine to be mounted in areas of limited space, such as in the back of taxicabs (e.g. behind the front seats). Mechanisms that receive cash or money (e.g. change such as quarters, dimes and nickels) take up a significant amount of depth in space and thus to keep the machine small (the dimensions of the housing are less than approximately 2 feet wide, less than approximately 2 feet tall, and less than approximately 5.5 inches deep), no cash is accepted in this example embodiment. Accordingly, when the software performs the operation of receiving payment for the at least one item using a payment system, the software in this configuration only accepts either credit card processing or payment by communicating with wireless communication (e.g. with an external device).

Figure 8:
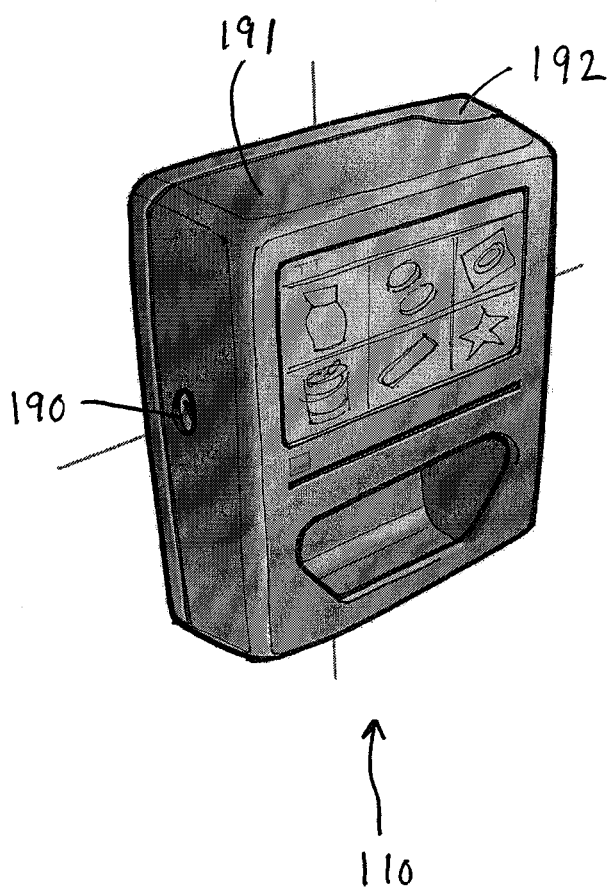
FIG. 8 is an alternative view of the TaxiTreats machine that accentuates the depth of the machine, the locking mechanism discussed in FIG. 4 and the restocking process.

As shown in FIG. 8, the vending machine will be locked (lock 190) and bolted within the mode of transportation and may be restocked at the centralized starting and ending point for the shift of the mode of transportation. The front of the machine may be a door 191 that can, in this example, open towards the rear passenger seat based on the hinge 192 in the far back right corner. As noted herein, once opened, the vending machine 110 can receive a plurality of removable cartridges 155 mounted within the vending housing 112 in cartridge slots 156. Each cartridge 155 maintains (e.g. holds) a set of pre-stocked items that can be dispensed from the vending machine under control of the vending computer program executing on the processor. The removable cartridges 155 are operable to be inserted into the vending housing while being preloaded with the set of items. This facilitates fast restocking since loading a large number of items only requires loading a single cartridge. As an example, if there are 6 items, the vending maintenance person only needs to load 6 separate cartridges. In example embodiments as shown, the plurality of removable cartridges 155 are (can be) stocked with items that include such things as a food item (e.g. mints, candy), a beverage item (an energy drink), gum, condoms, or a medicinal item (e.g. pain killer, heartburn relief or aspirin). It is to be understood that these are examples only and other items could be stored in the cartridges 155 as well, such as hair care items, makeup, office supplies, etc.

For a taxi, for example, the restocking of preloaded cartridges into the machine 110 can take place at taxi fleet parking garages. Stocking can include programming the computer program 134 to display electronic information in which case the item is simply a printed receipt that allows the passenger to redeem the receipt for a product or service, such as entry into a show, or a discount at a local restaurant. In addition to deals, goods and services, the invention may or may not have advertising 122 on the screen 114 and/or the remaining physical components of the machine. The advertising may or may not be for the goods or services available for purchase through the invention (point-of-sale advertising).

The user experience broadly consists of 1) passenger shift triggers reset of TaxiTreats software 2) TaxiTreats logo (shown in diagram below) and welcome screen 3) TaxiTreats purchase instructions and demo 4) TaxiTreats menu appears on touch screen in addition to point-of-sale banner ad 5) Passenger selects desired retail item, daily deal purchase, lottery ticket or location-based offer 6) Passenger selects quantity of desired item 7) Passenger either pays for item via credit card and credit card approval triggers transaction or purchase is tacked onto the fare of the mode of transportation and the passenger confirms purchase, triggering sale 8) Passenger either collects retail item directly from the invention, collects receipt or card to collect a good or service in the future or scans a unique identification from the invention to a device held by the passengers, such as, but not limited to, a wireless smartphone. In one configuration, receiving a payment indicator indicating that payment has been received for the item(s) includes receiving the payment indicator from a fare payment system of the taxicab 178. The payment indicator indicates to the vending machine 110 that a passenger of the taxicab has provided payment for the at least one item (e.g. via the taxi fare payment system). Alternatively, the vending machine can provide for payment of the item as well as the taxi cab fare.

Figure 10:
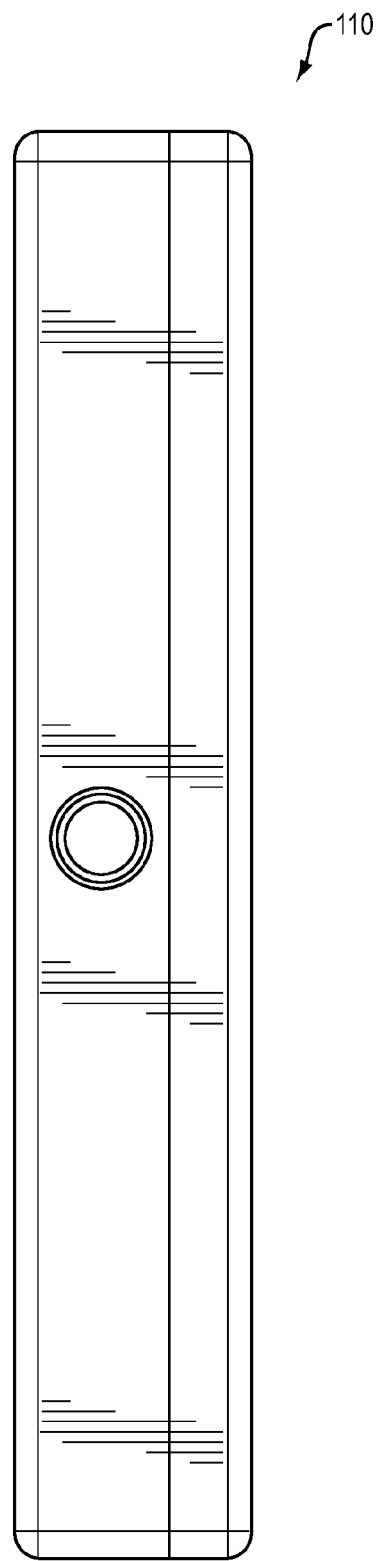
FIG. 10. is a side view of FIG. 9.

FIGS. 9 through 11 show an example of the internal mechanics of the vending machine. Those skilled in the art of vending machine manufacture will appreciate that not all details have been shown, and that there are many different configurations of such a machine as outlined herein. These example configurations show a small machine that can be easily mounted in a taxi or other vehicle to provide the functionality described herein. In FIG. 9, there is a lock 190 on the left side of the machine towards its middle. The machine will have a heavy-duty key lock 190. The key will be available to TaxiTreats employees only. The machine is designed to facilitate fast restocking time by TaxiTreats employees without requiring the "restocker" to enter the car. The "restocker" will be able to refill the machine by standing outside the rear passenger door on the driver's side, in this example. The cartridges 155 enable loading of the machine with a set of items all at once, as opposed to loading each item one by one.

Actions—Hardware Mechanics and Software/Hardware Interaction

The vending machine mechanics to dispense an item (e.g. a physical item, or a virtual item such as a ticket to a show, or a discount at a restaurant (delivered to the passenger via a printed receipt that can be used, for example, as a voucher to pick up a ticket at a will-call window of a venue) will be triggered by step 7 of the user experience "Passenger either pays for item via credit card and credit card approval triggers transaction or purchase is tacked onto the fare of the mode of transportation and the passenger confirms purchase, triggering sale." At that point, the TaxiTreats software program 134 will trigger the invention's main mechanism, starting the motor (e.g. the motor being an integral part of each cartridge, or a separate motor that engages a given cartridge to dispense an item) which triggers the release of retail product, printing of receipt or ability to scan a code or identification.

The following discloses a reloadable cartridge system of a modular vending machine, as also described in priority application U.S. Provisional Patent Application No. 61/764,823, filed Feb. 14, 2013, entitled "MODULAR VENDING MACHINE WITH RELOADABLE CARTRIDGE SYSTEM."

Reloadable Cartridge System:

1. The Process and Design of Having a Removable Component of a Vending Machine a. A vending machine where one or more key components, such as, but not limited to, the release mechanism to vend products, the motor to drive the release mechanism, the connection from the motor to the release mechanism, the connection from the hardware to the motor, or any combination thereof, can be taken in and out of the machine and interchanged.

The purpose of this modular approach to vending machine design and operations processes, in one case, is to maximize the speed of restocking the vending machine. In one example, if the release mechanism and storage housing for the vended product were interchangeable, the restocking of the vended products could be done quickly and efficiently, substantially reducing the time to restock the vending machine and improving the profitability of owning or operating a vending machine. One could quickly replace or restock components with full or functional components. The modular components may also have the ability to be shipped to partner locations, allowing the machines to be restocked, tuned up or fixed without deploying the vending machine operator's labor force.

b. Another purpose of the embodiment of the invention in 1a is to better track the reliability and durability of the vending machine components. In one example, if the vending machine motors are regularly replaced in the restocking or maintenance process, the motors can be checked and then put back into circulation to the vending machines. This process can optimize vending machine performance due to the frequent monitoring of parts. In another case, this monitoring system can be further analyzed to provide a deep understanding of the longevity of parts and predict failure and enact replacement of parts prior to actual failure.

Figure 12:
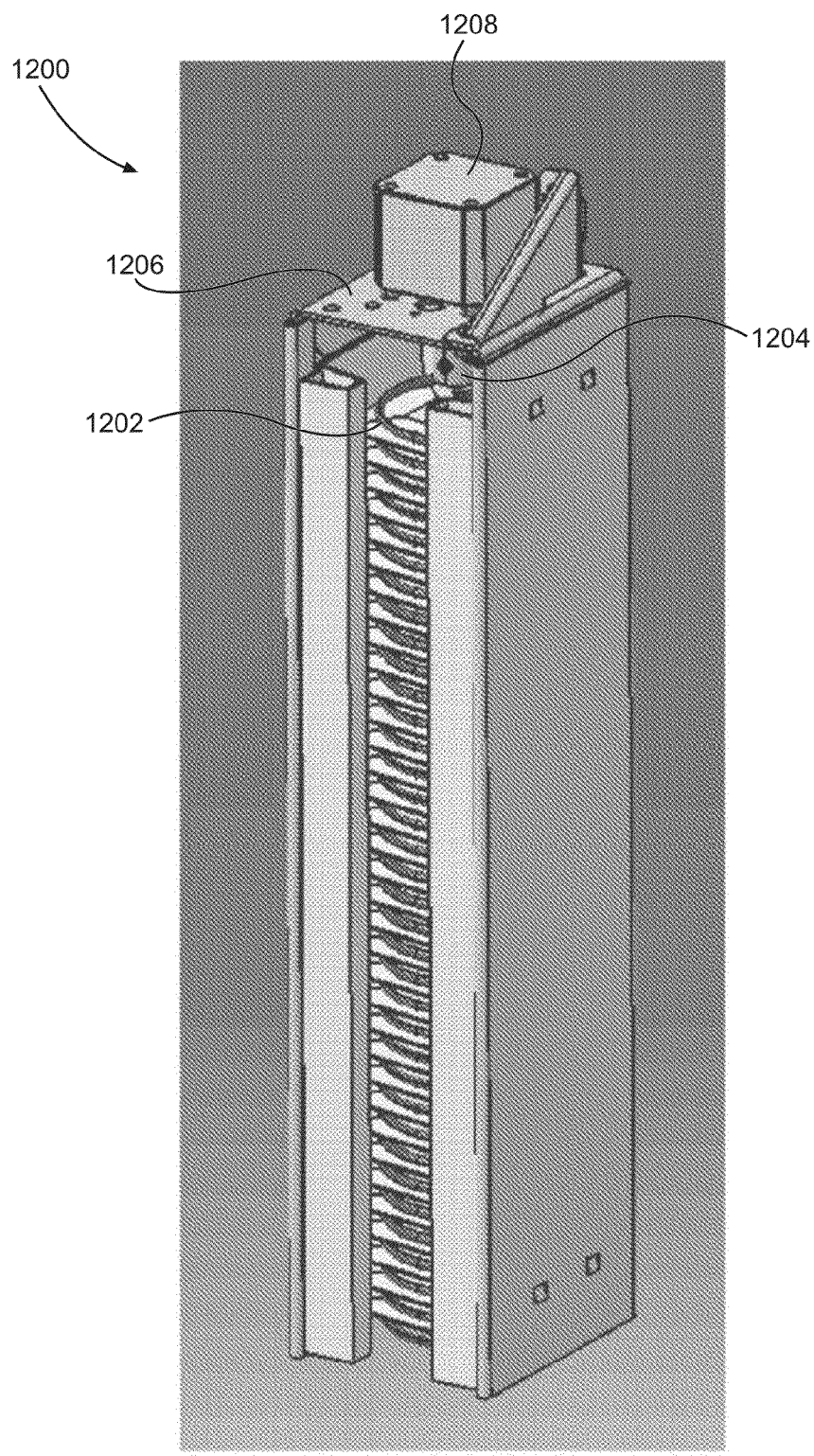
FIG. 12 is a perspective view of a cartridge.

2. The cartridge represents any modular component of the vending machine as described in 1a. Referring to FIG. 12, in one embodiment of the removable cartridge, the cartridge 1200 is a rectangle with two sides open. The cartridge consists of four walls, with two of the walls parallel and the third wall perpendicular, connecting the other two walls, and the remaining two sides of the rectangle open, without a wall.

The walls make up the housing of the cartridge and it may hang vertically inside the vending machine. See description of FIG. 13 below. Inside the housing of the cartridge is the release mechanism. In one embodiment of the cartridge, the release mechanism is a vertical coil 1202 that attaches to the top 1206 of the cartridge through a coupling 1204. Said coupling is ultimately to the motor 1208. The vertical coil 1202 may be optimized to fit the vended product through the spacing and tilt of each rung of the coil 1202. The coupling 1204 at the top of the cartridge 1200 may connect to the motor 1208 and, upon replacement of the cartridge, the motor 1208 may or may not be attached to the cartridge 1200 or stay within the vending machine. The cartridge 1200 may have a hole at the top 1206 of the cartridge 1200 to house and connect to the motor 1208. In another embodiment of the cartridge, it may have rail guides that surround the vertical coil to further ensure reliability of vending. The rail guides may be optimized based upon the dimensions of the vended product to ensure that the product cannot fall out of the vending mechanism which may be a vertical coil. These rail guides may or may not act as a fifth wall and allow the cartridges to be shipped without losing product and without providing access to the product in transit.

In one embodiment, the cartridge contains sensors that can detect the motor movement. The motor moves the release mechanism to the right location within the cartridge and also may or may not detect the physical passing of the vended item. These sensors intend for 100% reliability of vending experience meaning that if the product does not vend accurately, the sensors will acknowledge the failure and trigger the vending interface to display a message that the vending failed and the payment was not accepted or refunded.

Other embodiments of the cartridge may include different release mechanisms including using air to move vended products or using a conveyer belt system or using a punching mechanism where the top of the cartridge continues to moved downward with each vend, pushing out the vended product. The cartridge may be replaced out of the top of the vending machine, the bottom of the vending machine, the back of the vending machine, the front of the vending machine or the side of the vending machine. In one embodiment, all products in the machine side-by-side or front-to-back could represent one cartridge.

Figure 13:
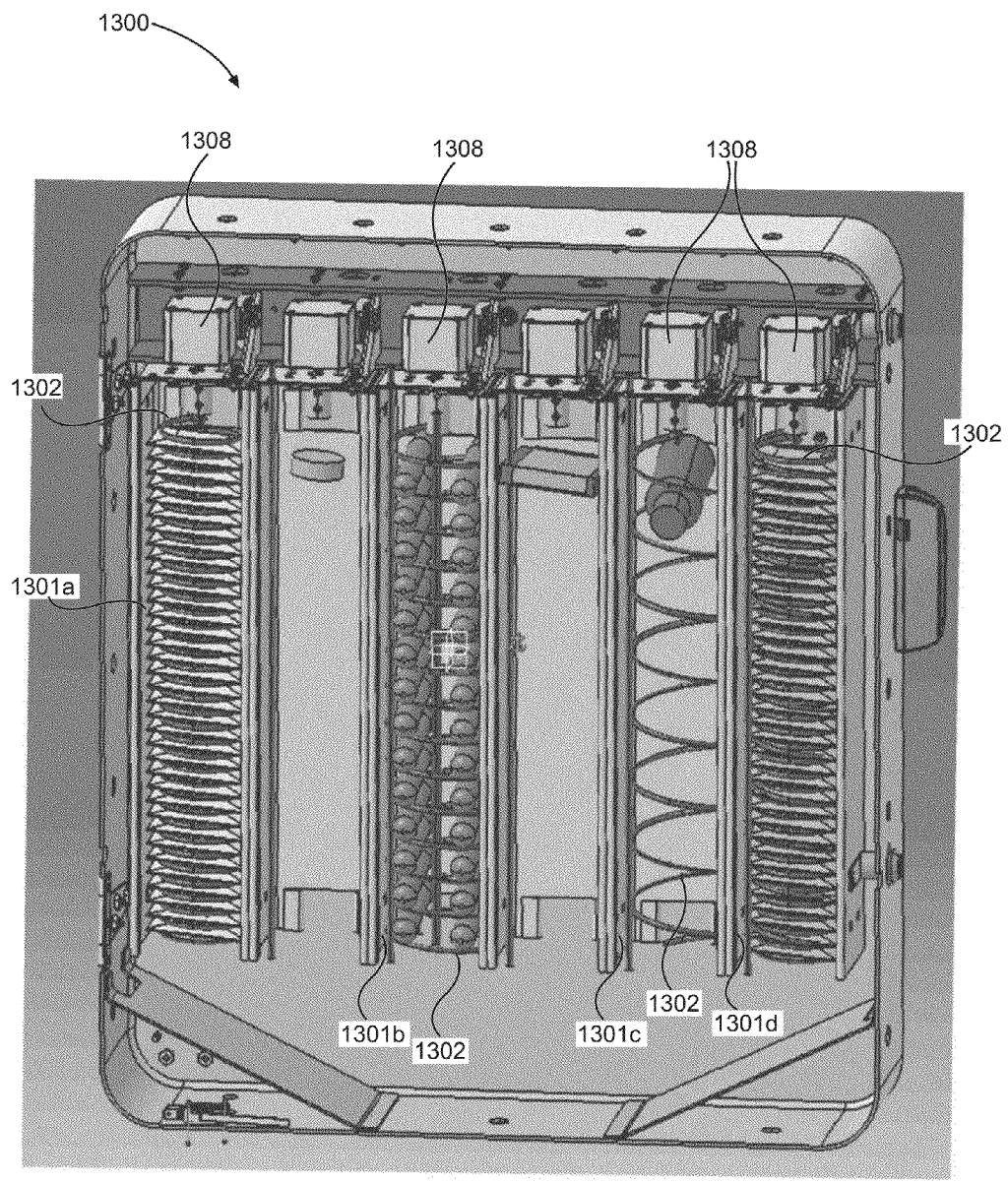
FIG. 13 is a perspective view of a modular vending machine with a reloadable cartridge system.
Figure 14:
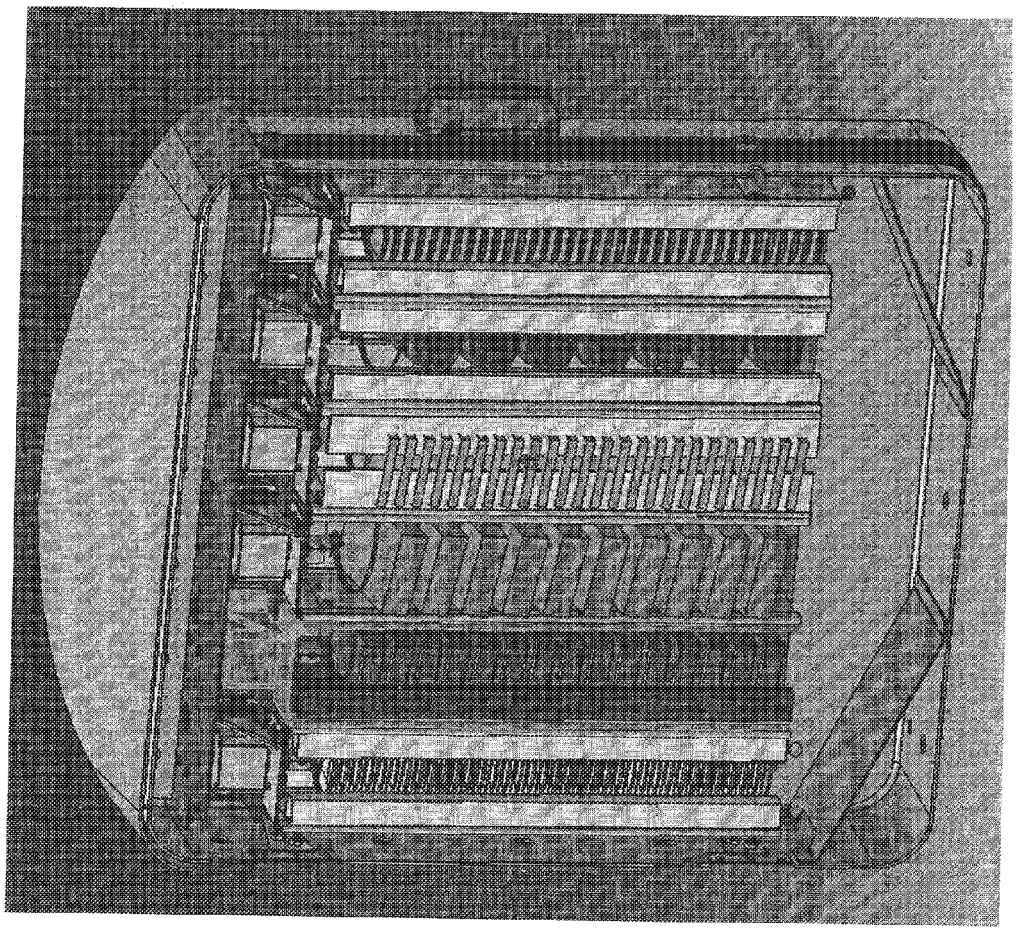
FIG. 14 is a perspective view of a modular vending machine with a reloadable cartridge system.

FIG. 13 depicts vending machine 1300 with a plurality of removable cartridges 1301*a-d* hanging vertically inside the vending machine 1300, each removable cartridge 1301*a-d* having a respective vertical coil 1302 and a respective motor 1308.

The cartridge may have one or more sensors to communicate the status and reliability of its vending performance and the position of the release mechanism. It may have a sensor at the top of the cartridge by the motor or connection and can force the motor to continue progressing until it reaches the proper location that results in a successful vend. This intelligence can substantially increase the reliability of a vending machine or other robotic requirement. The sensors can detect if the motor has completed a full rotation and makes sure the motor starts and finishes in the aligned location. There also may be a sensor on the bottom of the cartridge close to the product release point to separately confirm the physical pass through of the item into the vending retrieval area. The cartridge or vending machine may have multiple sensors that communicate with each other and with the operating system to have checks and balances and provide reliability and communication.

Different Embodiments of the Cartridge:

a) A vertical coil (e.g., 1202 in FIG. 12) as part of the removable cartridge (e.g., 1200 in FIG. 12) above.

b) A vertical coupling (e.g., 1204 in FIG. 12) connected to a coil and motor (e.g., 1208 in FIG. 12) as part of a removable cartridge. The vertical coupling (e.g., 1204 in FIG. 12) holds the coils and the stepper shaft. The coil is inserted into one end of the coupling and held in place with a set screw while the stepper motor (e.g., 1208 in FIG. 12) is inserted into the other end of the coupling and held in place with another set screw.

c) A cartridge that is restocked by a handheld machine that can insert the items in their entirety into the cartridge to prepare them for vend, rather than one by one. The machine may have a button that triggers the movement of the vended items or may be a vertical coil itself.

d) A cartridge that contains an ID Chip, RFID chip or barcode or scanner that can be recognized by the vending machine operating system and track the cartridge along with its components and product inventory. By track, what is meant in one example is tracking the serial number or ID that is designated, so the machine knows that type of product is being installed.

e) Instead of a coil-based vending system, the cartridge may utilize different release mechanisms such as a cartridge with different compartments or segments. Each compartment would be connected to a slide mechanism at the bottom of the compartment (like a drawer assembly) which is operated by a servo and belt. When the signal is given, the product is vended by the entire "drawer" sliding out—in which there is a hinged trap door underneath which falls away due to gravity thus allowing the product to fall (i.e. an automated drawer with a trap door and sensors). There could be a drop sensor attached near the release point to detect a drop. When there is a drop, the mechanism would retract. There could also be a sensor inside the compartment which detects the presence of an item. An advantage is that the items can be/are sealed in the cartridge during shipping and installation, thus minimizing theft.

f) A cartridge that contains a battery in to implement wireless communication, thus making the vending machine and cartridge independent entities. "Wireless" means both an RF receiver (or Bluetooth™) to receive signals sent by a RF transmitter (or Bluetooth™) connected up to the operating system and a Wi-Fi™ antenna connected to a microcontroller (in the cartridge) which sends inventory data to a database. The operating system then pulls data from the database and not directly from the cartridge.

What is claimed is:

1. A vending machine for use in a vehicle, the vending machine comprising:
    A vending housing operable to dispense at least one of a plurality of items stored within the vending housing;
    A display screen;
    A processor coupled to the display screen and the vending housing;
    A vending computer program configured to execute on the processor, the vending computer program, when executing on the processor, performing operations of:
        Displaying a selection of items on the display screen that can be purchased and dispensed from the vending housing;
        Receiving an identification of at least one item to be purchased;
        Receiving a payment indicator indicating that payment has been received for the at least one item and that payment has been received for at least one external product or service; and
        Controlling the vending machine to dispense that at least one item for which payment has been received; and
    A plurality of removable cartridges mounted within the vending housing, each cartridge maintaining a set of items that can be dispensed from the vending machine under control of the vending computer program executing on the processor, the removable cartridges operable to be inserted into the vending housing while being preloaded with the set of items,
    wherein each cartridge is mounted to hang vertically within the vending housing, each cartridge comprising a vertical coil attached to a top of the cartridge.

2. The vending machine of claim 1 wherein when the vending computer program executes to perform the operation of displaying a selection of items on the display screen that can be purchased, the vending computer program performs operations of:
    identifying a location associated to the vending machine;
    based on the location, identifying a selection of products related to the location; and
    displaying the selection of products available for purchase from the vending machine.

3. The vending machine of claim 1 comprising:
    An inventory tracking module integrated with the processor, the inventory tracking module operable to keep track of inventory of items that can be vended form the vending machine, the inventory tracking module operable to communicate inventory information of items in the vending machine to a remote location to allow the remote location to identify, to a vending machine operator, the inventory information.

4. The vending machine of claim 1 comprising:
    A wireless communication mechanism in communication with the processor and the vending computer program, the wireless communication mechanism operable by the vending computer program to wirelessly transmit product data to and from the vending machine, the product data including at least one of:
        data concerning items to be vended by the vending machine at specific times of the day;
        data concerning items to be vended by the vending machine when a taxicab is located in proximity to specific locations;
        data concerning quantity of items stocked within the vending machine;
        data concerning advertising information to be displayed on the display; and
        data concerning items to be delivered to a passenger of a taxicab at alternate locations that are not within confines of the taxicab.

5. The vending machine of claim 1 wherein when the vending computer program executes the operation of controlling the vending machine to dispense that at least one item for which payment has been received, the vending computer program performs operations of:
    Displaying the at least one item on the display screen to a passenger of the taxicab, the at least one item being information that can be utilized by the passenger to obtain at least one product, entertainment benefit or service as the item purchased from the vending machine.

6. The vending machine of claim 1, wherein the plurality of removable cartridges are stocked with items that include at least one of:
    A food item;
    A beverage item;
    Gum;
    Condoms; and
    A medicinal item.

7. A method for vending a product from a vending machine, the method comprising:
    Displaying a selection of items on a display screen that can be purchased;
    Receiving an identification of at least one item to be purchased;
    Receiving a payment indicator indicating that payment has been received for the at least one item and that payment has been received for at least one external product or service;
    In response to the payment indicator, controlling the vending machine to dispense that at least one item for which payment has been received,
    wherein the vending machine comprises:
    a vending housing operable to dispense at least one of a plurality of items stored within the vending housing;
    the display screen;
    a processor coupled to the display screen and the vending housing;
    a vending computer program configured to execute on the processor;

a plurality of removable cartridges mounted within the vending housing, each cartridge maintaining a set of items that can be dispensed from the vending machine under control of the vending computer program executing on the processor, the removable cartridges operable to be inserted into the vending housing while being preloaded with the set of items, wherein the plurality of removable cartridges are mounted to hang vertically within the vending housing, each cartridge comprising a vertical coil attached to a top of the cartridge.

8. The method of claim 7 wherein receiving a payment indicator indicating that payment has been received for the at least one item and that payment has been received for at least one external product or service comprises:

Providing a cost for an item to be vended form the vending machine to an external payment system that is external to a housing of the vending machine;

Allowing the external payment system to process payment for both the item and the at least one product or service vended form the vending machine, for which payment is received using the external payment system.

9. The method of claim 7 wherein displaying a selection of items on the display screen that can be purchased comprises:

identifying a location associated to the vending machine;

based on the location, identifying a selection of products related to the location; and displaying the selection of products available for purchase from the vending machine.

\* \* \* \* \*